United States Patent
Sakai

Patent Number: 5,851,902
Date of Patent: Dec. 22, 1998

[54] SEMICONDUCTOR LAYER STRUCTURE AND RECORDING MEDIUM FOR A LARGE CAPACITY MEMORY

[75] Inventor: Ikuo Sakai, Shizuoka, Japan

[73] Assignee: Hewlett-Packard Company, Palo Alto, Calif.

[21] Appl. No.: 598,299

[22] Filed: Feb. 8, 1996

[30] Foreign Application Priority Data

Feb. 8, 1995 [JP] Japan ...................................... 7-043401

[51] Int. Cl.⁶ .......................... H01L 21/030; H01L 21/46
[52] U.S. Cl. ........................... 438/459; 438/928; 438/977
[58] Field of Search ............................... 438/459, 3, 928, 438/977, 100

[56] References Cited

U.S. PATENT DOCUMENTS

| | | | |
|---|---|---|---|
| 3,037,205 | 5/1962 | Hagopian | 346/74 |
| 3,646,533 | 2/1972 | Rosenblum | 340/174.1 R |
| 4,394,529 | 7/1983 | Gounder | 136/245 |
| 4,524,376 | 6/1985 | Cornick | 357/55 |
| 5,036,490 | 7/1991 | Kajimura et al. | 365/151 |
| 5,216,631 | 6/1993 | Silwa, Jr. | 365/174 |

FOREIGN PATENT DOCUMENTS

| | | | |
|---|---|---|---|
| 0 518 283 A2 | 12/1992 | European Pat. Off. | G11B 9/00 |
| 60186119 | 8/1985 | Japan | G11B 5/31 |
| 63268087 | 11/1988 | Japan | G06K 19/00 |
| 6333276 | 10/1994 | Japan | G11B 9/00 |
| 6333276 | 12/1994 | Japan | G11B 9/00 |
| WO 93/21637 | 10/1993 | WIPO | G11C 11/22 |

OTHER PUBLICATIONS

Wolf et al., Silicon Processing for the VLSI Era: vol. 1–Process Technology, Lattice Press, p. 539, 1986.

*Primary Examiner*—John F. Niebling
*Assistant Examiner*—David A. Zarneke

[57] ABSTRACT

A layered structure for a semiconductor substrate has a planar surface, lighter weight, and increased flexural rigidity. By decreasing warping in a multilayered recording medium that arises when forming the recording layer, while suppressing an increase in the weight of the memory substrate, a recording medium for a compact, large capacity memory device can be manufactured. The recording medium is positioned opposite a read/write circuit substrate that is provided with a plurality of miniature probes. A recording layer is formed on a front surface of a memory substrate, a beam structure for reinforcing flexural rigidity is formed on a back surface of said memory substrate. A conductive layer may be formed between the memory substrate and the recording layer.

4 Claims, 4 Drawing Sheets

SEMICONDUCTOR LAYER STRUCTURE AND RECORDING MEDIUM FOR A LARGE CAPACITY MEMORY

BACKGROUND OF THE INVENTION

1. Technical Field

The invention relates to a semiconductor device having a planar semiconductor layer structure. More particularly, the invention relates to a recording medium that is used in large capacity recording elements that record, play back, and use scanning probe technology, such as scanning tunneling microscope (STM) and atomic force microscope (AFM).

2. Description of the Prior Art

Many large capacity memory devices using STM or AFM technology, which have resolution on the order of atoms, have been proposed and their future is very promising. Various recording materials have been proposed for use as a recording medium for a variety of large capacity memory devices. One such material is an inorganic, ferroelectric material having a perovskite structure, such as barium titanate or lead zirconate titanate (PZT ($PbZr_xTi_{1-x}O_3$)).

The technologies where these ferroelectric materials are used as a recording medium have been disclosed by the applicants of this patent in, for example Japanese Patent Laid-Open Publication No. 63-193349 and Japanese Patent Application No. 6-270297. These memory devices are basically composed of the recording medium, a read/write circuit substrate positioned opposite the recording medium, and means for driving at least the recording medium or the read/write circuit substrate.

FIGS. 1(A) to 1(C) illustrate a conventional large capacity memory device. FIG. 1(A) is a side view of the recording medium of the memory device. FIG. 1(B) is a perspective view of the read/write circuit substrate 6. FIG. 1(C) is a view of the whole large capacity memory device 7.

As shown on FIG. 1(A), the recording medium 5 is constructed in layers including the conductive layer (lower electrode) 52 on top of the memory substrate 51 that forms lattice grooves G and the recording layer (ferroelectric thin-film layer) 53. Usually, the memory substrate 51 is a silicon monocrystal. When the recording layer 53 is PZT, there are problems such as the interdiffusion of the silicon monocrystal and constituent elements, such that fabricating a thin PZT film having excellent ferroelectric characteristics is difficult. Because of this situation, as shown in FIG. 1(A), interdiffusion is prevented by forming a conductive layer 52 from one or multiple metal layers, and it is then possible to grow a thin film, such as PZT, having excellent ferroelectric characteristics.

As shown on FIG. 1(B), a read/write circuit 61 containing probe tips 62 at the same pitch as the lattice pitch of the grooves G on the surface of the read/write circuit substrate 6 forms a matrix. As shown on FIG. 1(C), the recording medium 5 and the read/write circuit substrate 6 are situated so that the recording layer 53 and the probe chips 62 are positioned opposite each other. Usually, the recording medium 5 is scanned in the X-Y directions by the driving means, shown as the micromover driver 8 on FIG. 1(C).

The read/write circuit 61 shown on FIG. 1(B) has a one-to-one correspondence with each area divided by the lattice grooves G. Each probe chip 62 is held at a constant distance that touches or is very close to the surface of the corresponding recording layer 53 either all of the time or only when needed.

The large capacity memory device 7 controls scanning in contact with or close to the surface of the recording layer 53 corresponding to the probe chips 62 for recording or playing back information at the specified position.

In this kind of large capacity memory element, a read/write circuit 61 that contains the probe chips 62 cannot be created without using LSI fabrication technology. The preferred material used is silicon. In contrast, the recording medium 5, or at least the memory substrate 51 positioned opposite the read/write circuit 61, is preferably made of silicon to prevent relative position offsets due to thermal expansion.

Various growth techniques have been proposed when an inorganic, ferroelectric material, such as PZT having a perovskite structure, is used as the recording layer 53. When growing the thin film by any technique, the substrate temperature must be maintained at about 500° C. to 600° C. or a thin film having the composition with a perovskite structure cannot be obtained. Consequently, when the thin film deposition at the substrate temperature of about 500° C. to 600° C. is returned to room temperature, the linear coefficient of expansion of silicon, which is the substrate material as described above, is smaller than the linear coefficient of expansion of the inorganic ferroelectric material, such as PZT. Therefore, extremely high stress remains between the recording layer 53 and memory substrate 51, and warping develops in the recording medium 5.

When warping develops in the recording medium 5, it is not possible to maintain the probe chips 62 used in read/write at a constant distance that is extremely close to the surface of the recording layer 53, nor is it possible for the probe chips for read/write to be in contact with the surface of the recording layer 53 at a constant pressure. This kind of warping should be mitigated.

The grooves that combined the region divisions on the memory substrate 51 shown on FIGS. 1(A) and 1(C) in the conventional manner are formed, but this is not sufficient. The memory substrate 51 must be thick. The thickness of the memory substrate 51 (wafer thickness) can be several tens of microns, but a residual stress remains on the wafer's front or back surface when the wafer is thinned. Therefore, processing at. the desired thickness equivalent to several tens of microns with complete flatness is not easy. Consequently, the memory substrate 51 must be thickened.

In contrast, because the most important feature of a large capacity memory device 7 is small size and large capacity, the micromover drive 8 is designed to be small (corresponding to the size of the recording medium). Therefore, capacity restrictions arise in the micromover drive 8. Consequently, there are limits with regard to drive power. To achieve a high density, large capacity recording, high-precision position control is required and the micromover drive 8 must be large.

Although some of the problems described above can be solved by using a small area for the memory substrate 51, an extremely small size and large capacity memory device 7 cannot be satisfactorily produced in accordance with the state of the art.

SUMMARY OF THE INVENTION

The invention provides a design for a surface that is a lighter weight, planar semiconductor substrate, as well as a layer structure for a semiconductor capable of increasing the flexural rigidity of the substrate. In addition, the invention provides a recording medium for a small-sized, large capacity memory device by reducing the warping of the multilayer recording medium that is produced when forming the recording layer (ferroelectric thin film layer), all while suppressing any increase in the weight of the memory substrate.

The semiconductor layer structure herein described features a surface that forms a beam structure for reinforcing the flexural rigidity on the back of a planar semiconductor substrate.

The recording medium herein described is provided for a large capacity memory device, where a plurality of miniature probes is positioned opposite a read/write circuit substrate. The invention provides a recording layer on the front surface of a memory substrate and forms a beam structure for reinforcing the flexural rigidity on the back surface of the memory substrate. Hereinafter, this embodiment of the invention is also referred to as the first recording medium.

In addition, the recording medium herein described is also intended for use as a recording medium for a large capacity memory device where a plurality of miniature probes are positioned opposite a read/write circuit substrate. The invention also provides a recording layer on the front surface of the memory substrate and a plurality of recording medium element columns that project out of the back surface of the memory substrate, where the memory substrate sets upon the columns on a base part. Hereinafter, this embodiment of the invention is also referred to as the second recording medium.

In either the first or second recording medium, the material of the memory substrate can be a silicon monocrystal. In addition, a conductive layer can be formed between the memory substrate and recording layer. The layer structure of the semiconductor may be either a single layer or it may comprise multiple layers. In accordance with the invention, even when the semiconductor substrate is made thinner, the flexural rigidity of the substrate is reinforced by a beam structure on the back surface.

By using the beam structure formed on the back surface of the memory substrate in the first recording medium, the flexural rigidity of the thin plate per unit weight is increased, while an increase in weight of the entire memory substrate is suppressed. Therefore, the area of the memory substrate is not decreased, i.e. the amount of information recorded is not sacrificed, yet warping of the recording medium is prevented or reduced. The probe chips are maintained at a constant distance that is very close to the surface of the recording layer or, alternatively, the probe chips used for read/write can be in contact with the surface of the recording layer at a constant pressure.

In the second recording medium, the recording medium is structured from a plurality of recording medium elements. Therefore, warping of the recording medium elements can be prevented or reduced. Moreover, in the second recording medium, each recording medium element is constructed from a column that set on the base part. Therefore, an increase in the weight of the entire recording medium can be suppressed.

BRIEF DESCRIPTION OF THE DRAWINGS

FIG. 1(A) illustrates a conventional recording medium, FIG. 1(B) illustrates a recording playback circuit substrate; and FIG. 1(C) illustrates the configuration of a large capacity memory in the state where these elements are combined;

FIGS. 2(A) and 2(B) show one embodiment of the first recording medium of the invention, in which FIG. 2(A) is a side view of the recording medium and FIG. 2(B) is a top view of the same;

DETAILED DESCRIPTION OF THE INVENTION

Figure 2A:
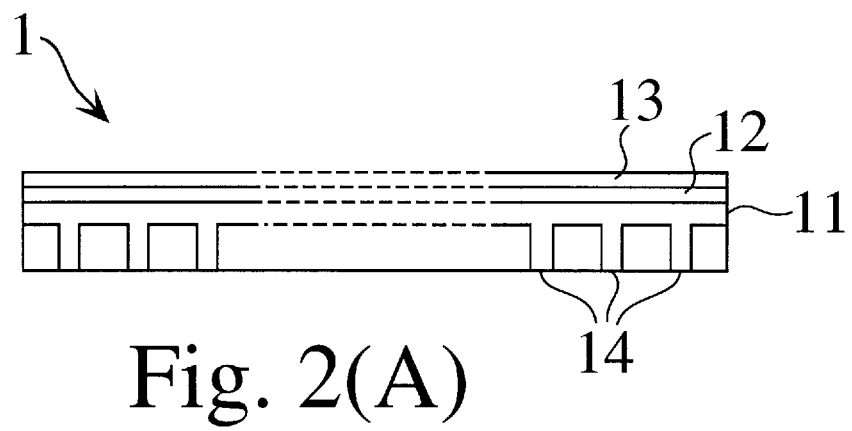
Figure 2B:
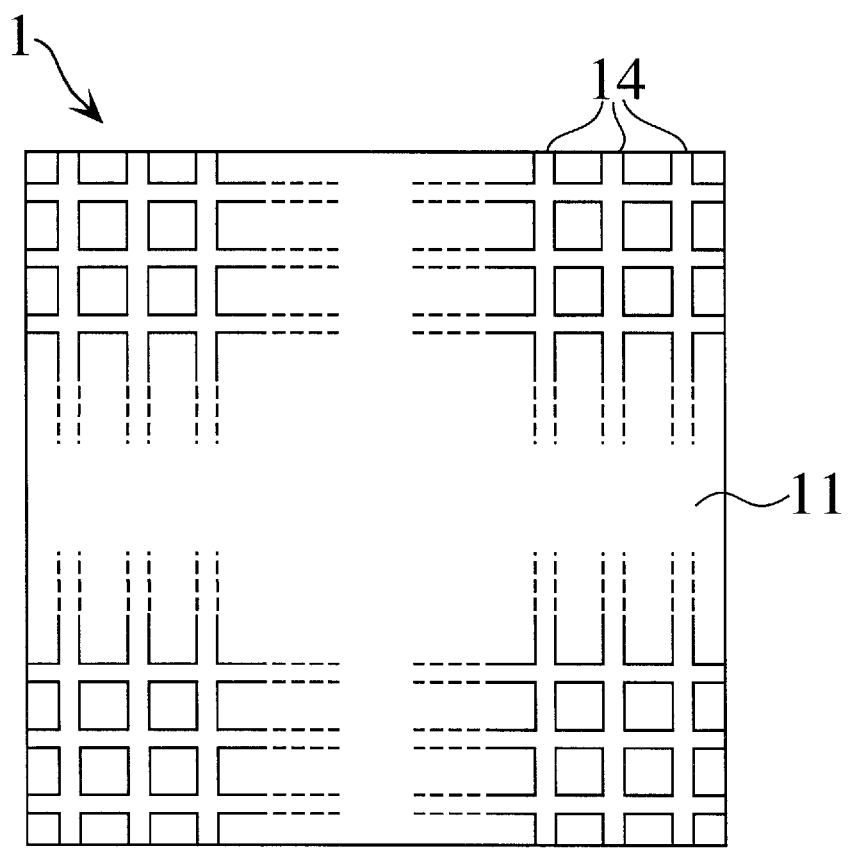

One embodiment of the first recording medium is explained with reference to the figures. FIGS. 2(A) and 2(B) provide a side view showing the structure of the first recording medium and a top view seen from the back, respectively. In FIG. 2(A), a conductive layer 12 (lower electrode layer) is formed on the front surface of a memory substrate 11, and the recording layer 13 is formed on the conductive layer. The recording medium 1 is formed from these layers. The memory substrate 11 is formed from silicon monocrystal; the conductive layer 12 is formed from one or a plurality of metal layers; and the recording layer 13 is formed from a ferroelectric material. The material in the conductive layer 12 can be chosen, for example from such materials as platinum, titanium nitride, or ruthenium oxide.

As shown on FIG. 2(B), a wall or rib of vertical beams 14 is formed on a square lattice on the back of the memory substrate 11. These beams 14 have the role of eliminating or greatly mitigating warping that may be caused by temperature changes of the memory substrate 11, conductive layer 12, and recording layer 13.

Figure 3:
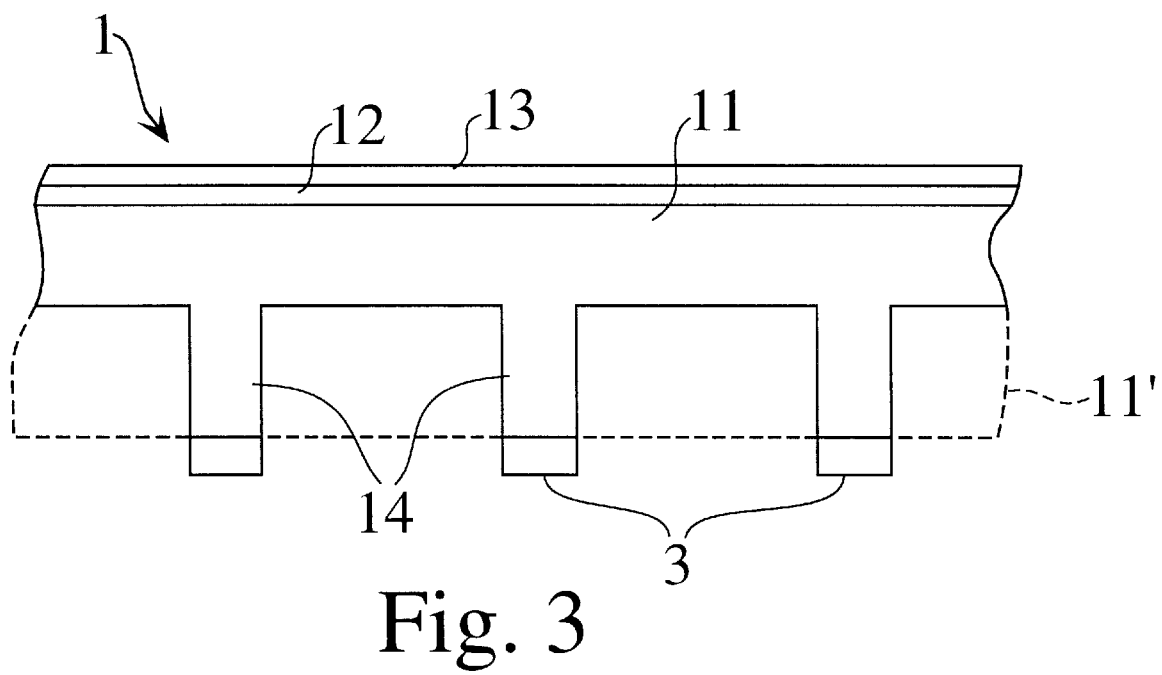
FIG. 3 is a view that illustrates the use of a dry process to form a beam structure on a back surface of the memory substrate in the first recording medium.

As shown on FIG. 3, the structure can include an etching mask 3 defined by a photoresist on the back surface of the substrate 11' (indicated by dashed lines in FIG. 3) of the memory substrate 11 and can be formed by reactive ion etching. In this embodiment, the width of a wall-shaped beam 14 is $20\mu$; the height is $50\mu$; the grid interval of the wall-shaped beam 14 is $100\mu$; the thickness in the part remaining in the etched part of the memory substrate 11 is $50\mu$.

In this example, the flexural rigidity of the memory substrate 11 is 3.2 times the flexural rigidity of a memory substrate having a thickness of $50\mu$ that has a planar back surface without beams 14. The increase in the weight of the memory substrate 11 is 20% of the memory substrate without beams 14. To maintain a planar surface for the memory substrate without the beam structure, the thickness of the memory substrate is simply increased. To attain the same flexural rigidity as the memory substrate 11 shown on FIG. 2(A), the weight of the memory substrate without beams 14 is increased by 47%.

By forming the beams 14, while keeping the increase in weight of the entire recording medium 1 to a low level, the flexural rigidity of the recording medium 1 can be increased. Therefore, a recording medium 1 can be manufactured that is lightweight and that exhibits no or reduced warping.

Figure 4:
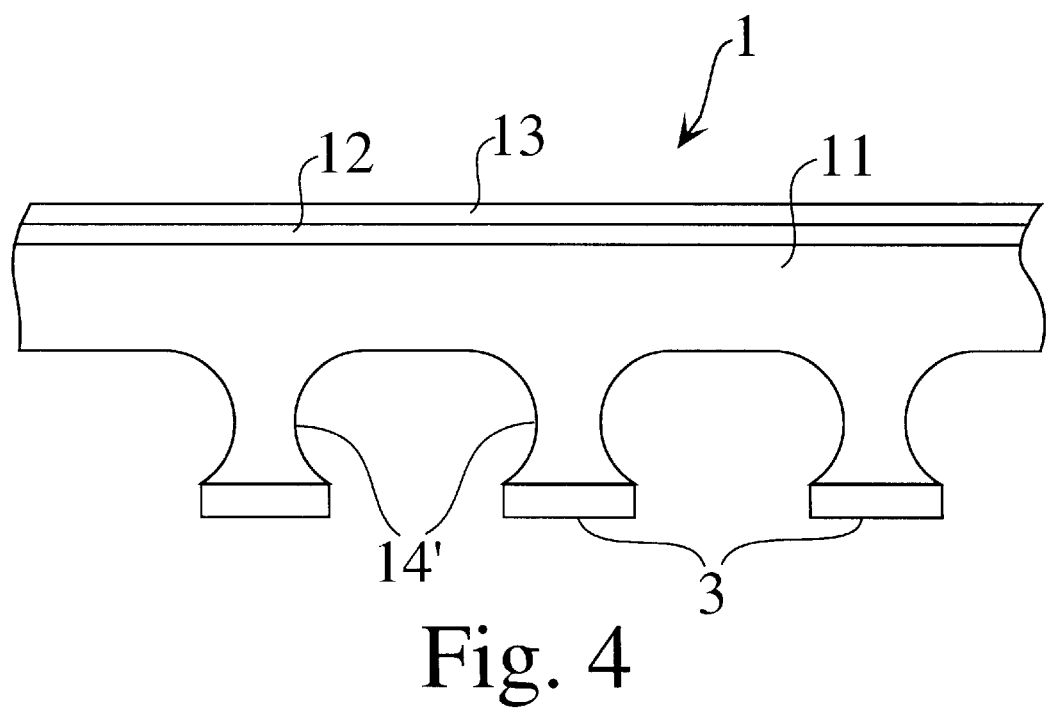
FIG. 4 is a view that illustrates the use of a wet process to form a beam structure on a back surface of the memory substrate in the first recording medium.

FIG. 4 illustrates an embodiment of the invention in which the beams 14' are formed by wet etching after the etching mask 3 is formed on the back surface of the memory substrate 11. In contrast to the polygonal beams 14 formed by reaction ion etching shown on FIG. 3, the beams 14' are shaped with a central portion gouged out when processed by wet etching. The beams 14' shaped in this way increase the flexural rigidity of the recording medium 1 compared to the beams 14 shown on FIG. 3.

In wet etching, accurate control of the profile shape caused by over etching is somewhat difficult compared to that of a dry etching process. Because there is no thermal damage to the memory substrate 11 in a wet etching process in contrast to a dry etching process, satisfactory fabrication is possible without adding stress to the memory substrate 11. This is true even for an extremely thin wafer of 100μ. Therefore, wet etching places no stress on the memory substrate 11. Moreover, similar to the recording medium 1 shown in FIG. 3, a recording medium 1 having increased flexural rigidity can be manufactured while checking an increase in overall weight that may be added to the structure by the beams 14.

Figure 1A:
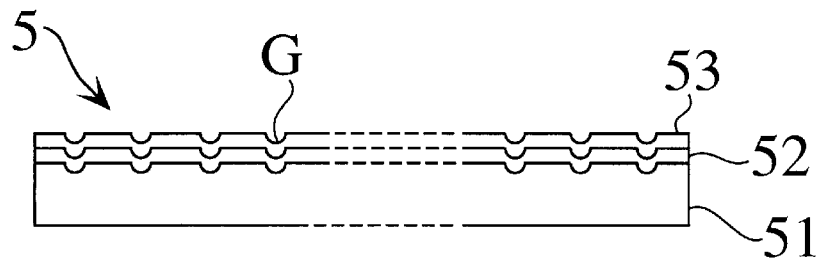
FIGS. 1(A) to 1(C) illustrate conventional technology, where
Figure 1B:
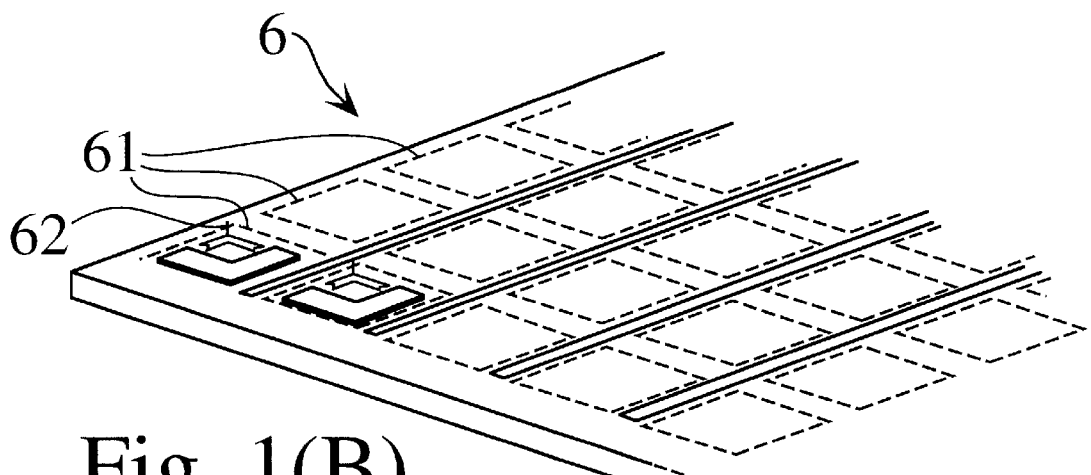
Figure 1C:
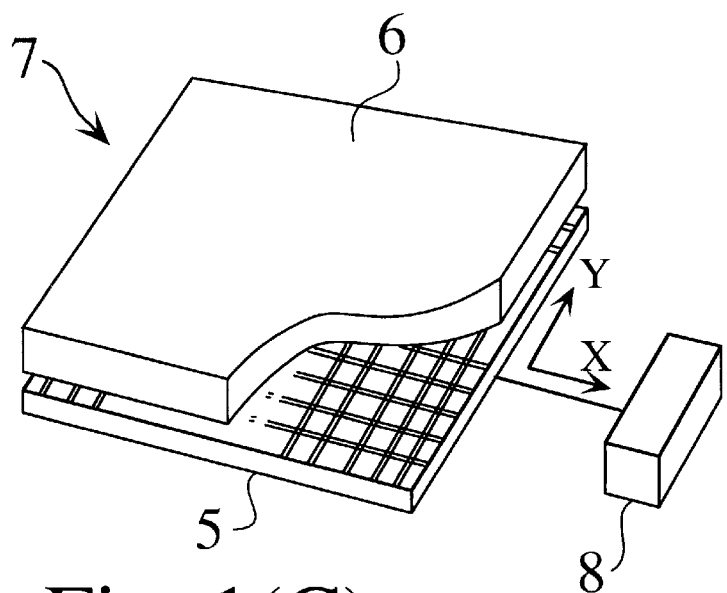

With regard to the first recording medium, the embodiments where dividing grooves are not formed on the front surface of the memory substrate 11 have been described, although dividing grooves, as illustrated on FIGS. 1(A) and 1(C), can be formed using the invention. By forming the recording medium in combination with such dividing grooves, warping prevention can be further improved.

Furthermore, because the flexural rigidity of the memory substrate 11 is increased, an embodiment using lattice-shaped beams 14 has been described, although the shape of the beams 14 is not limited to the lattice shape and can be other shapes, such as a honeycomb shape. Profiled circular and rectangular holes on the back surface of the memory substrate 11 can be cut at predetermined intervals. In this case, the parts not having holes become the beams 14.

The lattice or honeycomb pitch can be appropriately changed depending on the direction in which the memory substrate 11 warps. For example, the pitch can be decreased at the center of the memory substrate 11 and increased at the edges. Alternately, the pitch at the center of the memory substrate 11 can be increased and decreased at the edges. Furthermore, the beams 14 do not always have to be formed from the same material as the memory substrate 11.

Figure 5:
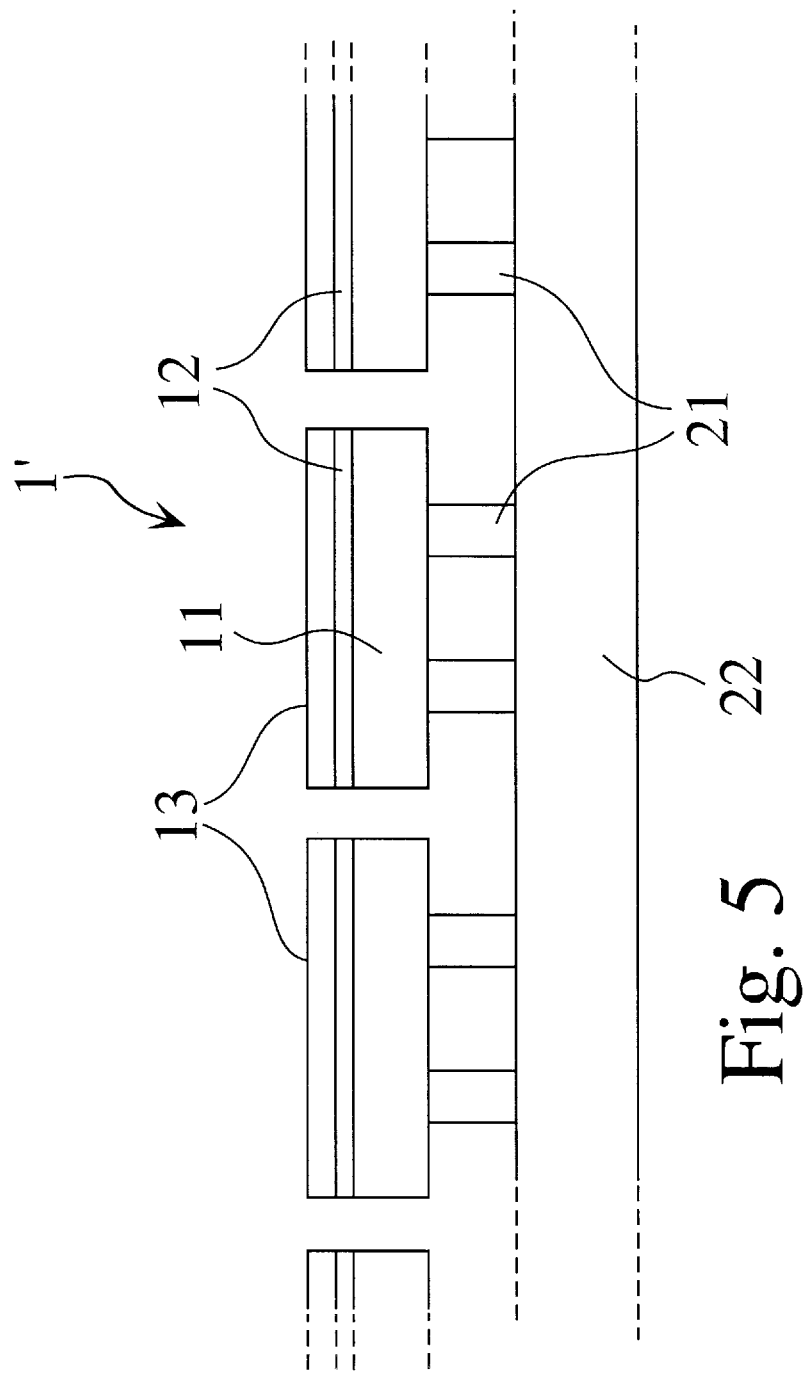
FIG. 5 is a view showing an embodiment of the memory substrate in accordance with the second recording medium.

FIG. 5 is a side view of the second recording medium. As shown on FIG. 5, to construct the recording medium element 1', the conductive layer 12 is formed on the front surface of the memory substrate 11, the recording layer 13 is formed on top of the conductive layer, the columns 21 are formed on the back surface of the memory substrate 11 and project therefrom. The recording medium element 1' is supported by the columns 21 on a base material 22.

As shown on FIG. 2(A), the memory substrate 11 is formed from silicon monocrystal; the conductive layer 12 is formed from one or a plurality of metal layers; and the recording layer 13 is formed from a ferroelectric thin film. The structure of the memory substrate 11 is complex compared to the memory 3 of the structure shown on FIGS. 2 to 4. The structure can be created by modern silicon technology, for example by silicon micromachining.

In this embodiment, the memory substrate 11 is divided into multiple tiles and forms the conductive layer 12 on a memory substrate 11 which is 10μ thick and 50μ wide and which is formed from silicon monocrystal. At a temperature of 600° C., even when PZT is formed at 500 Å as the recording layer 13, the amount of warping can be suppressed to a very small value below 0.1μ. Moreover, where the entire memory substrate 11 is attached, the base material 22 is completely isolated from the effect of warping caused by the difference in the linear coefficient of expansion when forming the recording layer 13. Consequently, the base material 22 can be thinned to several tens of microns and provide a recording medium 1' that does not warp and that is also lightweight.

In the second recording medium, the embodiment in which a ferroelectric film is used as the recording layer 13 has been described. However, if another material, for example a magnetic material, polymer material, alloy material, semiconductor material, or insulator material can record information by changing some physical state electrically, magnetically, optically, or in a material crystal structure, then a similar superior effect as provided by the invention can be achieved using such materials in conjunction with the invention.

The invention can achieve the following effects according to the above structure:

A multilayered or single layer semiconductor layer structure can be manufactured, where the flexural rigidity of the structure is increased, in addition to providing a structure that is light weight and that has a planar surface. Consequently, the structure so produced is excellent for application to the semiconductor technology field, such as the use in a layered structure of a target test object when measuring the surface layers or as a recording medium for a memory device.

The flexural rigidity of the memory substrate can be increased while suppressing an increase in weight. Therefore, a lightweight, large capacity recording medium that eliminates or that exhibits almost no warping can be manufactured.

Each recording medium element may be divided and set upon a base material by columns formed on a back surface of the structure. The warping of each memory medium can be kept to a sufficiently small range. In addition, even when the base supporting the memory substrate is thin, it is not affected by warping that results from the difference in the thermal coefficient of expansion between the memory substrate and recording layer. Therefore, a lightweight, large capacity recording medium that eliminates or that exhibits almost no warping can be manufactured.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A method for forming a semiconductor structure, comprising the steps of:

providing a semiconductor substrate; and forming a beam structure consisting of a wall or rib of vertical beams formed as a rectangular lattice or honeycomb on a back surface of said semiconductor substrate to reinforce the flexural rigidity of said substrate in accordance with a process comprising the steps of:

providing an etching mask in the form of a photoresist on a back surface of said substrate that defines a pattern describing the wall or rib of vertical beams formed as a rectangular lattice or honeycomb; and etching said substrate back surface to form said beam structure.

2. A method for forming a recording medium for a large capacity memory device that is positioned opposite a read/write circuit substrate equipped with a plurality of miniature probes, comprising the steps of:

providing a memory substrate;

forming a beam structure consisting of a wall or rib of vertical beams formed as a rectangular lattice or honeycomb on a back surface of said memory substrate to reinforce the flexural rigidity of said substrate in accordance with a process comprising the steps of:

providing an etching mask in the form of a photoresist on a back surface of said substrate that defines a pattern describing the wall or rib of vertical beams formed as a rectangular lattice or honeycomb; and etching said substrate back surface to form said beam structure; and forming a recording medium on a front surface of said memory substrate.

3. The method of claim 2, wherein silicon monocrystal is used as said memory substrate material.

4. The method of claim 2, further comprising the step of:

forming a conductive layer between said memory substrate and said recording medium.

* * * * *